(12) United States Patent
Jacquemont et al.

(10) Patent No.: US 9,976,652 B2
(45) Date of Patent: May 22, 2018

(54) SEALING DEVICE

(71) Applicant: DEFONTAINE, La Bruffiere (FR)

(72) Inventors: Eric Jacquemont, Clisson (FR); Jean-Michel Delacou, Mortagne sur Sevre (FR); Didier Chatry, La Bruffiere (FR)

(73) Assignee: DEFONTAINE, La Bruffiere (FR)

( * ) Notice: Subject to any disclaimer, the term of this patent is extended or adjusted under 35 U.S.C. 154(b) by 0 days. days.

(21) Appl. No.: 13/905,933

(22) Filed: May 30, 2013

(65) Prior Publication Data

US 2013/0323061 A1 Dec. 5, 2013

(30) Foreign Application Priority Data

Jun. 4, 2012 (FR) ..................................... 12 55171

(51) Int. Cl.
*F16J 15/34* (2006.01)
*F16J 15/3236* (2016.01)
*F16C 33/78* (2006.01)
*F16J 15/06* (2006.01)
*F16J 15/3276* (2016.01)
*F03D 80/00* (2016.01)

(52) U.S. Cl.
CPC .......... *F16J 15/3236* (2013.01); *F03D 80/00* (2016.05); *F16C 33/782* (2013.01);
(Continued)

(58) Field of Classification Search
CPC .... F16J 15/3256; F16J 15/3232; F16J 15/164; F16J 15/3236; F16J 15/061;
(Continued)

(56) References Cited

U.S. PATENT DOCUMENTS 2,856,208 A * 10/1958 Cobb .................. F16C 33/7859
277/369
3,572,857 A * 3/1971 Hasegawa ..................... 384/482
(Continued)

FOREIGN PATENT DOCUMENTS

DE 20 2008 017335 U1 10/2009
DE 20 2010 014830 * 3/2011
(Continued)

OTHER PUBLICATIONS

International Search Report isssued in FR 1 255 171, dated Mar. 26, 2013, 2 pages.

*Primary Examiner* — Nathan Cumar
(74) *Attorney, Agent, or Firm* — Arent Fox LLP

(57) ABSTRACT

The present invention relates to a sealing device including a sealing circular piece, an inner ring and an outer ring, with one being able to rotate relative to an axis. The circular piece is arranged between the two rings and comprises two circular lips arranged in a groove inclined with respect to the axis of rotation. The groove is provided on the outer face of the inner ring. An attachment profile is fixed in an orifice formed in the outer ring. The inclination of the groove makes it possible to increase the potential contact surface area perpendicular to the axis of rotation of the crown ring, since, for a given distance between an outer edge and an inner edge of a ring, the groove can be longer, improving the resistance of the top lip to expulsion. The two lips are prestressed in the groove allowing for a better hold.

11 Claims, 3 Drawing Sheets

(52) U.S. Cl.
CPC ......... *F16C 33/7886* (2013.01); *F16J 15/061* (2013.01); *F16J 15/3276* (2013.01); *F16C 2300/14* (2013.01); *F16C 2360/31* (2013.01)

(58) Field of Classification Search
CPC ....... F16J 15/3276; F03D 11/00; F03D 80/00; F16C 33/782; F16C 33/7886; F16C 2300/14; F16C 2360/31
USPC ............... 277/353, 551, 562, 566, 567, 573; 384/477, 484, 486
See application file for complete search history.

(56) References Cited

U.S. PATENT DOCUMENTS

| | | | |
|---|---|---|---|
| 4,854,749 A | | 8/1989 | Kohigashi et al. |
| 4,969,423 A | * | 11/1990 | Kitauchi ............... F02F 7/0053 123/65 R |
| 5,683,186 A | * | 11/1997 | Akimoto ....................... 384/607 |
| 5,860,748 A | * | 1/1999 | Okumura et al. ............. 384/486 |
| 6,776,531 B2 | * | 8/2004 | Tsuchida et al. ............. 384/484 |
| 2002/0009246 A1 | * | 1/2002 | Tsuchida et al. ............. 384/486 |
| 2006/0291761 A1 | * | 12/2006 | Gietl .................... F16C 33/7853 384/486 |
| 2011/0075958 A1 | * | 3/2011 | Yamaguchi ......... F16C 33/7853 384/484 |
| 2011/0103728 A1 | | 5/2011 | Cowles et al. |

FOREIGN PATENT DOCUMENTS

| | | | |
|---|---|---|---|
| DE | 20 2010 014830 U1 | | 3/2011 |
| DE | 20 2010 014 830 | * | 4/2011 |
| DE | 20 2010 014830 | * | 4/2011 |
| FR | 2 479 374 A1 | | 10/1981 |
| JP | H04 1724 U | | 1/1992 |
| JP | 2002/372060 A | | 12/2002 |
| JP | 2004/270775 A | | 9/2004 |
| JP | 2007 255682 A | * | 3/2006 |
| JP | 2007-255682 A | | 10/2007 |

* cited by examiner

SEALING DEVICE

CROSS-REFERENCED TO RELATED APPLICATIONS

This application is based upon and claims priority to French Application No. 1 255 171, filed Jun. 4, 2012, the disclosure of which is hereby incorporated in its entirety by reference.

The present invention relates to a circular sealing device used in particular on the crown rings that include rolling bearings such as, for example, those of wind turbine blades.

These devices usually comprise two circular sealing pieces, usually made of rubber, an outer ring and an inner ring concentric to the first ring. The sealing pieces are fixed symmetrically, the first on top and pressing on one of the rings, the second underneath and pressing on the other ring and placed between the two rings. They comprise a lip that is positioned pressing on the outer face of the movable ring relative to their respective fixing.

However, these devices are not reliable enough because above a certain pressure of the lubricating product or of the inner grease the lip becomes detached and the seal is thus no longer provided, which creates leaks towards the outside. For purely ecological and aesthetic reasons, the grease which flows onto the blades or the hub of a wind turbine gives an impression and a reality of pollution which is damaging to the clean wind power image. This is all the more critical since these devices have large dimensions and the quantities of lubricant involved can be significant. For example, the crown rings of multiple mega watt wind turbine blades, which have diameters of several meters, currently 2 to 6 m, and certainly more in the near future.

The present invention sets out to resolve this problem by proposing a sealing device comprising a sealing circular piece, an inner ring and an outer ring, one of the two rings being able to rotate relative to an axis, the circular piece being arranged between the two rings, characterized in that the circular piece comprises two circular lips arranged in a groove inclined relative to the axis of rotation of the ring provided on a face of one of the rings, a top lip and a bottom lip substantially at right angles to the top lip, said bottom lip has a radius of curvature directed towards the interior and an attachment profile fixed in another groove formed in the other ring. The inclination of the groove and of the lips makes it possible to increase the potential contact surface area compared to a conventional groove perpendicular to the axis of rotation of the crown ring, since, for a given distance between an outer edge and an inner edge of a ring, the groove can be longer. The pressure of this lip on the inclined surface of the groove increases with the pressure of the greasing product or of the lubricant to be kept confined inside the rolling bearing. The top surface of the groove is oriented to oppose the pivoting movement of one of the two lips since it is almost perpendicular to this movement, and thus the resistance of this lip to expulsion is improved. The two lips are prestressed in the groove which provides for a better hold, and the internal pressure increases this prestress by the unwinding of the other lip. The bottom lip, situated inside, under the effect of the pressure of the grease, runs towards the bottom of the groove, its radius of curvature increases which increases the contact pressure of the top lip by virtue of its orthogonal position. The pressure of the two lips situated in the groove on the sides of this groove increases and, with it the effectiveness of the seal. Thus, the pressure of the lips adapts to the pressure prevailing inside the rolling bearing, when the pressure of the grease is low, there is a low contact pressure of the lips on the faces of the grooves and, conversely, if the pressure increases, the pressure of the lips increases. The inclination of the groove makes it possible to reinforce the pressure on the top lip, which prevents expulsion when the internal pressure is too high.

According to a particular feature, the groove is inclined upward. The upward inclination promotes the separation of the impurities from the edge of the seal, gravity driving them toward the middle of the sealing piece.

According to another feature, the two sides of the groove are parallel.

According to another embodiment, the bottom side of the groove is flared relative to the top edge. This flared shape allows for easier insertion of the two lips into said groove.

According to a another feature, the attachment profile is a fir tree profile.

According to a particular provision one of the two lips presses on the top side of the groove.

According to another feature, the second lip presses on the bottom side of the groove. The flared bottom side increases the retention of the bottom lip when the latter pivots under the pressure of the grease, the shape and the section of the bottom lip have been optimised so that the pressure of the contact increases when the pressure of the grease increases.

According to a particular feature, the sealing circular piece comprises a heel pressing on a face of the ring. This heel makes it possible to hold the attachment profile in place on said ring and, with the aim of increasing the pressure retained before the expulsion of the fir tree profile, the pressure exerted on the heel increases with the internal pressure of the lubricating product.

According to another feature, the ring has a peripheral bump which cooperates with the heel. The peripheral bump is placed inside the outer ring or outside the inner ring and, if appropriate, ensures that the heel is completely immobilized on said ring.

The invention also relates to a wind turbine blade crown ring equipped with a sealing device having one or more of the preceding features.

Other advantages may still become apparent to the person skilled in the art on reading the example below, illustrated by the appended figure, given for illustrative purposes.

FIG. 2 also shows a rotation axis X and a direction outside of a raceway 6.

Figure 1:
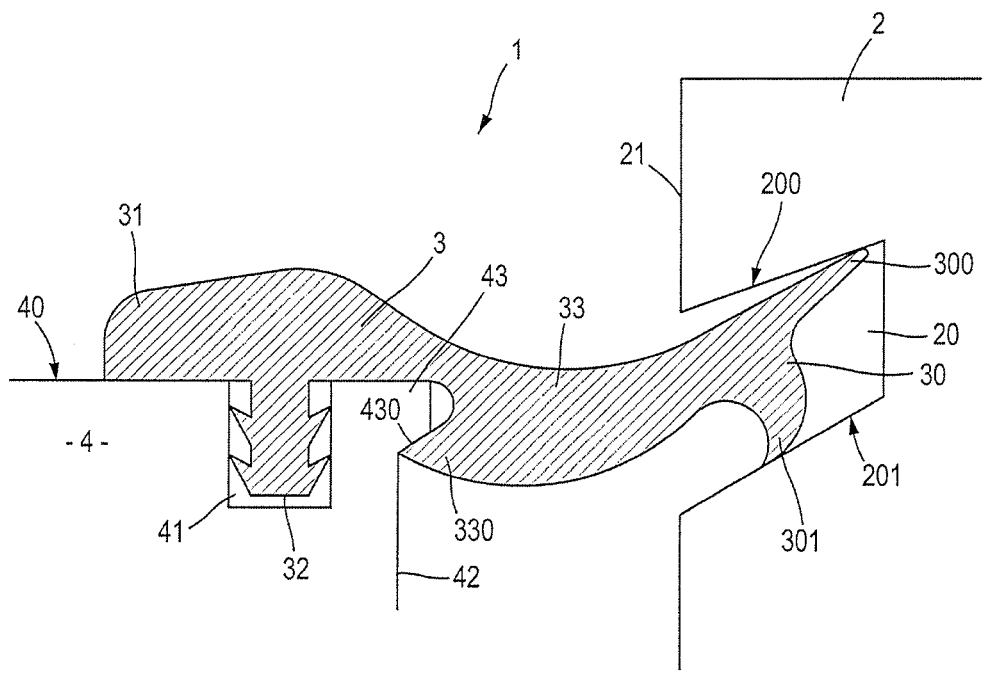
FIG. 1 represents a cross-sectional view of the sealing device according to the invention with a bottom side of the groove that is flared.

Hereinbelow in the description, it will be assumed that the top is situated at the top of the figures and the bottom is situated at the bottom, the outside is situated on the right of the figure and the inside is situated on the left.

The sealing device 1 according to the invention comprises an inner ring 2 and an outer ring 4, and between the two is arranged a sealing circular piece 3 or seal. The axis of the rings is common (not represented) and situated in the right hand part of the figure. It will be assumed that the axis of the rings constitutes the centre of the sealing device and that the lubricant is placed beneath the sealing circular piece 3.

The inner ring 2 has, on its outer face 21, a circular groove 20. The groove 20 has two flanks: a top side 200 situated outside the zone where the lubricating product is placed and a bottom side 201 situated next to the lubricating product.

The bottom side 201 is more downwardly inclined than the top side 200, thus defining a flared groove. The two sides 200 and 201 could be parallel without departing from the framework of the invention.

Figure 2:
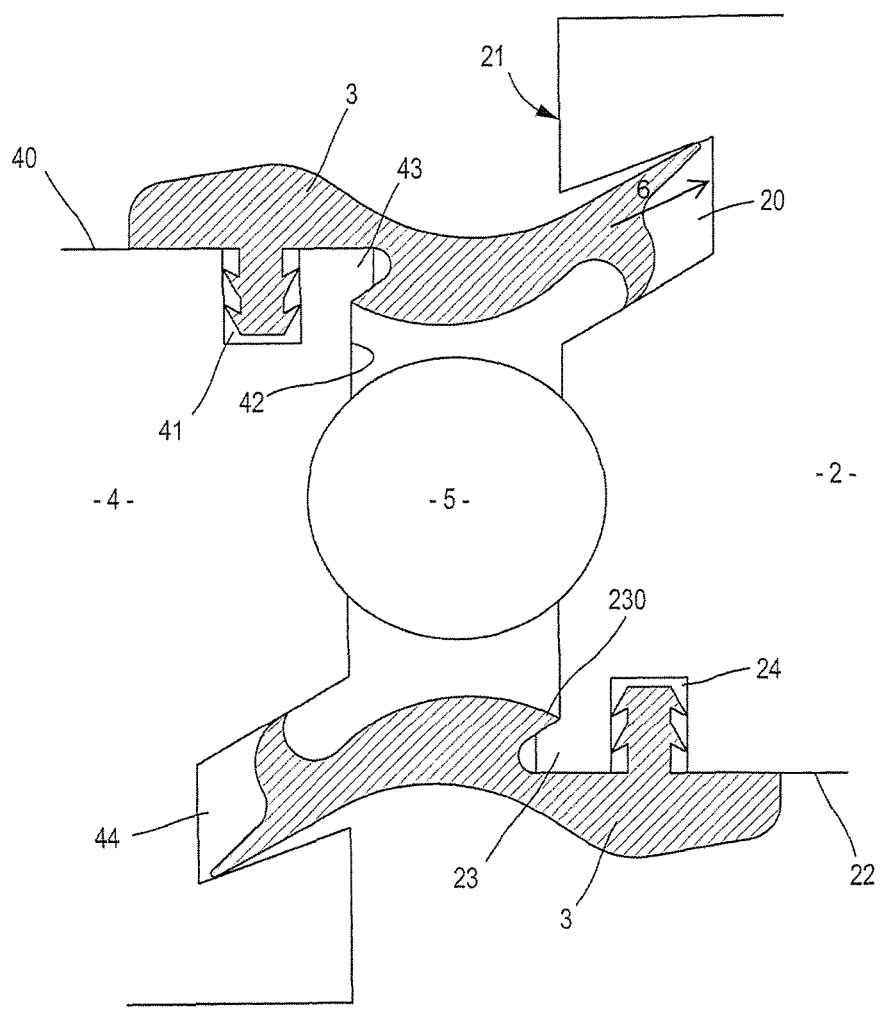
FIG. 2 shows a rolling bearing in cross section.
Figure 3:
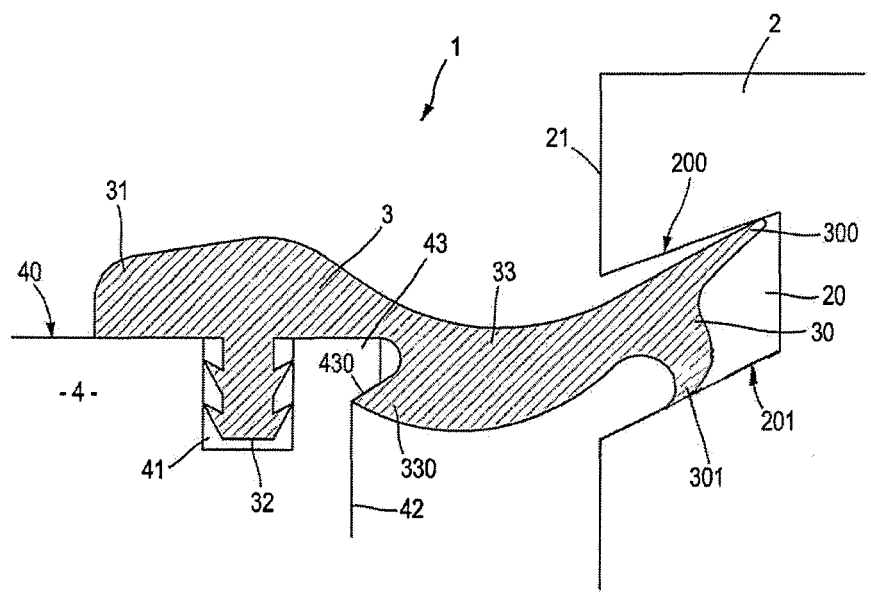
FIG. 3 shows a cross-sectional view of the sealing device according to the invention with bottom side and top side of the groove that are parallel.

Similarly, the outer ring 4, as can be seen in FIG. 2, has, on its inner face 42, a circular groove 44. Since the groove 44 is identical to the groove 20, it will not be described further.

The outer ring 4 has a top face 40 which is pierced by a groove 41. The ring 2 is likewise pierced by an orifice 24 on the bottom face 22 of said ring 2.

The sealing piece 3 has, on its inner part 30, two circular lips 300 and 301. The two lips 300 and 301 are at right angles to one another. The top lip 300 presses on the top side 200 of the groove 20, and the bottom lip 301 presses on the bottom side 201 of the groove 20. The top lip 300 is substantially parallel to the top side 200, whereas the bottom lip 301 is substantially at right angles to the bottom side 201. The bottom lip 301 has a radius of curvature 302 directed inwards. The pressure of the lubricating product tends to unwind the lip 301, which pushes the lip 300 into contact with the surface 200 and thus increases the contact area between said lip 300 and the surface 200. The pressure tends to create a radial force which opposes the extrusion of the two lips of the groove.

The sealing piece 3 has, in its outer part 31, an attachment profile 32 oriented downwards in the figure to cooperate with the groove 41. It is oriented upwards for the orifice 24 situated on the face 22 of the ring 2. The profile 32 is a fir tree profile. The orientation crown ring comprises a rolling bearing 5 and two seals of this type in FIG. 2:

one in the top part with its fixing part 31 on the ring 4, the face 40 of which is the face pressing on the rolling bearing support, one in the bottom part with its fixing part 31 on the other ring 2, the face 22 of which is also the pressing face.

The sealing piece 3 also has a heel 330 situated in the central part 33 of said piece 3. This heel 330 is oriented towards the face 21 or the face 42 and cooperates with the side 21 or 42 of the ring 2 or 4. The side 21 or 42 has a peripheral bump 23 or 43 on which the heel 330 presses. The bump 23 or 43 has an edge 230 or 430 substantially parallel to the heel 330.

The invention claimed is:

1. A sealing device comprising at least one sealing circular piece, an inner ring and an outer ring, one of the inner ring and the outer ring being configured to rotate relative to a rotation axis, the circular piece being arranged between the inner ring and the outer ring, wherein at least one of the inner ring and the outer ring comprise a first groove inclined less than 90° with respect to the rotation axis, comprising a top portion and a bottom portion and provided on a face of one of the inner ring and the outer ring, wherein the circular piece comprises a top lip and a bottom lip inside of the first groove, the top lip and bottom lip straddling, via direct contact, to the top portion and the bottom portion of the first groove, respectively, wherein the bottom lip is substantially perpendicular to the top lip, wherein said bottom lip is substantially perpendicular to the bottom portion of the first groove and has a concave radius of curvature directed towards the interior of the sealing circular piece, and wherein the top lip is substantially parallel to the top portion of the first groove, and an attachment profile fixed in a second groove formed in the other ring.

2. The sealing device according to claim 1, characterized in that the first groove is inclined towards outside of a raceway.

3. The sealing device according to claim 1, wherein the bottom portion and the top portion of the first groove are parallel.

4. The sealing device according to claim 1 or 2, characterized in that the bottom portion of the first groove is flared relative to the top portion.

5. The sealing device according to claim 1, characterized in that the attachment profile is a fir tree profile.

6. The sealing device according to claim 3, characterized in that the top lip presses on the top portion of the first groove.

7. The sealing device according to claim 3, characterized in that the bottom lip presses on the bottom portion of the first groove.

8. The sealing device according to claim 1, characterized in that the sealing circular piece comprises a heel pressing on a face of the inner ring or the outer ring.

9. The sealing device according to claim 8, characterized in that the inner ring or the outer ring has a peripheral bump which cooperates with the heel.

10. A wind turbine blade crown ring, characterized in that it is equipped with a sealing device according to claim 1.

11. The sealing device according to claim 3, wherein a first circular lip of the two circular lips contacts the bottom portion of the first groove and a second circular lip of the two circular lips contacts the top of the first groove.

* * * * *